UNITED STATES PATENT OFFICE.

FRANCIS LAUR, OF PARIS, FRANCE.

IMPROVEMENT IN MANUFACTURE OF SULPHATE OF ALUMINA.

Specification forming part of Letters Patent No. 208,615, dated October 1, 1878; application filed August 10, 1878.

*To all whom it may concern:*

Be it known that I, FRANCIS LAUR, engineer, of Paris, in the Republic of France, have invented Improvements in the Manufacture of Sulphate of Alumina, of which the following is a specification:

The object of this invention is to manufacture with aluminous earths, (containing more or less iron,) such as argil, kaolin, &c., and by preference with hydrates of alumina, known under the name of "bauxites," and containing fifty to eighty per cent. of alumina, a sulphate of alumina completely deprived of free acid, and exempt, or almost exempt, from iron, and such as it has not been possible to manufacture up to the present time.

I proceed in the following manner: Into a vessel of lead, or lined with lead, I pour a certain quantity of sulphuric acid at 50° Baumé—two hundred kilograms, for instance. I heat it by means of a jet of live steam. When the sulphuric acid begins to boil, I pour into the acid one hundred and ten to one hundred and thirty kilograms of bauxite (hydrate of alumina) in a powdered form. At the end of some minutes a very lively reaction takes place. The mixture, which, before the reaction, ought to occupy only one-fifth, at most, of the capacity of the vessel, will even flow over, if care is not taken to add at this moment sixty to sixty-five liters of water. The mixture is thus kept in the vessel, and, if it threatens again to flow over, I add some liters of water to prevent it. At the end of about an hour the mixture has returned to its original volume. I then add water at pleasure, according to the degree of concentration which it is desired to obtain, and I thus have a solution of sulphate of alumina containing one-half per cent. of iron in combination.

The unattacked silicate of the bauxite and the unattacked bauxite slowly precipitate, and are very easily separated by decantation.

To obtain sulphate of alumina free from iron, I merely introduce old pieces of zinc into the ferruginous solution of sulphate — three to five kilograms in the example given. The zinc is attacked, and at the end of four to five hours when under heat, and one to two days when under cold, the iron is precipitated in the form of black powder, which is deposited at the same time as the silicate. When the precipitation is complete it only remains to siphon or decant the limpid solution, which is absolutely deprived of free acid, and does not become blue, or is scarcely made blue, by prussiate of potash.

In the example chosen—that is to say, two hundred kilograms of acid at 50°—there is obtained three hundred kilograms of sulphate of alumina in solution, which it is only necessary to concentrate under heat up to 46° Baumé, and pour it off into a cake, by the ordinary method.

It is indispensable to employ a bauxite very finely ground, or to increase the proportion of it, to obtain at the first trial a neutral solution, or almost neutral solution, the elimination of the iron being based on this fact: that, while in an acid solution of ferruginous sulphate of alumina, the metallic zinc serves only to reduce the iron ($Fe^2O^3$) to the minimum of oxidation, (FeO,) in a neutral solution it entirely precipitates the peroxide of iron and replaces it.

The product I obtain by this process is a sulphate of alumina, first, completely exempt from free acid; second, not hydrometric and not absorbent of moisture; third, capable of being ground as finely as may be desired; and, fourth, (lastly,) possessing a quantity of alumina which may reach twenty per cent., and which is never lower than eighteen per cent. These qualities are not met with in the sulphates of alumina which are found in commerce, and they may serve to characterize the new product resulting from the process I have described.

I claim—

As an improvement in the process of manufacturing sulphates of alumina, rendering the acid solution neutral, and then introducing pieces of zinc to precipitate the iron in the said solution prior to concentration, substantially as described.

In testimony whereof I have signed my name to this specification in the presence of two subscribing witnesses.

F. LAUR.

Witnesses:
T. BAUDROJE,
COURCEL ALEXANDRE.